(12) United States Patent
Gunzer et al.

(10) Patent No.: US 10,962,757 B2
(45) Date of Patent: Mar. 30, 2021

(54) SYSTEM FOR THE SIMULTANEOUS VIDEOGRAPHIC OR PHOTOGRAPHIC ACQUISITION OF MULTIPLE IMAGES

(71) Applicant: Universitaet Duisburg-Essen, Essen (DE)

(72) Inventors: Matthias Gunzer, Essen (DE); Reinhard Viga, Krefeld (DE); Sven Olfen, Duisburg (DE); Anton Grabmaier, Moers (DE); Marc Schuster, Essen (DE)

(73) Assignee: Universitaet Dulsberg-Essen, Essen (DE)

( * ) Notice: Subject to any disclaimer, the term of this patent is extended or adjusted under 35 U.S.C. 154(b) by 175 days.

(21) Appl. No.: 16/320,777

(22) PCT Filed: Jul. 13, 2017

(86) PCT No.: PCT/EP2017/000835
§ 371 (c)(1),
(2) Date: Jan. 25, 2019

(87) PCT Pub. No.: WO2018/019406
PCT Pub. Date: Feb. 1, 2018

(65) Prior Publication Data
US 2019/0162944 A1    May 30, 2019

(30) Foreign Application Priority Data

Jul. 25, 2016 (DE) .......................... 10 2016 008 854

(51) Int. Cl.
*G02B 21/36* (2006.01)
*G02B 21/08* (2006.01)
(Continued)

(52) U.S. Cl.
CPC ......... *G02B 21/361* (2013.01); *G02B 21/004* (2013.01); *G02B 21/0004* (2013.01);
(Continued)

(58) Field of Classification Search
CPC   G02B 21/361; G02B 21/0004; G02B 21/004; G02B 21/086; G02B 21/18; G02B 21/362
(Continued)

(56) References Cited

U.S. PATENT DOCUMENTS 6,137,535 A * 10/2000 Meyers ................ G02B 3/0043
348/340
2001/0002120 A1   5/2001 Bessendorf
(Continued)

FOREIGN PATENT DOCUMENTS

EP        0 840 502 A2     5/1998
WO        02/075370 A2     9/2002
WO        2013/099141 A1   7/2013

*Primary Examiner* — Collin X Beatty
(74) *Attorney, Agent, or Firm* — Norris McLaughlin, P.A.

(57) ABSTRACT

A system for the simultaneous videographic or photographic acquisition of images, in particular of samples in a plurality of sample chambers of a sample plate, preferably a microtiter plate, includes an array of microscopes having mutually parallel optical axes, wherein each microscope includes an imaging chip and an objective. The imaging chips are attached to a carrier board as an array of columns and rows. An electronics unit for processing image data for all the microscopes is associated with the carrier board.

21 Claims, 9 Drawing Sheets

(51) Int. Cl.
*G02B 21/18* (2006.01)
*G02B 21/00* (2006.01)

(52) U.S. Cl.
CPC ............ *G02B 21/086* (2013.01); *G02B 21/18* (2013.01); *G02B 21/362* (2013.01)

(58) Field of Classification Search
USPC ........................................................ 359/363
See application file for complete search history.

(56) References Cited

U.S. PATENT DOCUMENTS

| | | | |
|---|---|---|---|
| 2003/0146372 A1 | 8/2003 | Hsieh et al. | |
| 2003/0197791 A1 | 10/2003 | Ogino | |
| 2004/0004759 A1 | 1/2004 | Olszak | |
| 2004/0101210 A1 | 5/2004 | Weinstein et al. | |
| 2010/0033561 A1* | 2/2010 | Hersee | H01L 33/06 348/80 |
| 2014/0098213 A1* | 4/2014 | Sato | G02B 21/367 348/79 |
| 2014/0333998 A1 | 11/2014 | Kohli et al. | |
| 2016/0041375 A1* | 2/2016 | Zhan | H04N 5/2259 348/79 |

* cited by examiner

SYSTEM FOR THE SIMULTANEOUS VIDEOGRAPHIC OR PHOTOGRAPHIC ACQUISITION OF MULTIPLE IMAGES

BACKGROUND OF THE INVENTION

The invention relates to a system for the simultaneous videographic or photographic acquisition of multiple images, in particular of samples in multiple sample chambers of a sample plate, preferably a microtiter plate, comprising at least one array of microscopes having mutually parallel optical axes, wherein each microscope comprises a dedicated imaging chip and a dedicated objective.

A microscope is generally understood to mean a device that allows a sample to be viewed or displayed in a magnified state compared to the natural size thereof, in which the image of the sample is thus magnified in the eye of the observer or on an imaging chip.

Systems comprising cameras disposed in arrays are known in the prior art. It is known, for example, to configure each of a plurality of standard cameras, such as reflex cameras, with an imaging chip and an objective, so as to form an array in which the cameras are disposed next to one another in multiple rows and columns.

Such configurations are used, for example, to be able to acquire the same motif exactly simultaneously using different exposure parameters or, using identical exposure parameters, so as to magnify the photographic resolution beyond the resolution of each individual imaging chip.

In medical technology and biology, the application of videographically or photographically acquiring multiple samples in sample chambers of sample plates is known. For example, when cell movements are to be documented so as to draw diagnostic conclusions therefrom. Preferably, the trajectory of an autonomously moving living cell is to be visualized in the process. For economic reasons, as many different samples as possible are to be acquired within a predefined time window.

Previously, the procedure has been to record each sample in the different sample chambers consecutively by way of a photo-capable or video-capable microscope, comprising an imaging chip and an objective. For this purpose, a new sample chamber is positioned in the optical axis of the microscope between the respective acquisitions by moving the sample plate relative to the microscope, which is stationary in the ground reference system.

Displacement of the sample plates has previously taken approximately 2 seconds, from one sample chamber to the next, so that, with a desired temporal resolution of the documented cell movement of less than 8 seconds, it is not possible to acquire more than 4 sample chambers before the sample plate has to be moved back to the first of the 4 sample chambers. An acquisition of, typically, 96 sample chambers of a microtiter plate corresponding to the industry standard is therefore very time-consuming and not possible by way of existing systems for films having a temporal resolution of less than 8 seconds per sample chamber.

In addition to the high time expenditure, there is also the problem that the movement of the sample plate relative to the stationary microscope causes every sample or the cells present therein and the liquid surrounding the same to be accelerated and decelerated again. The resulting momenta acting on the cells and the liquid may be superimposed on natural cell movements and distort measurement results.

Merely disposing multiple individual microscopes (comprising an imaging chip and an objective) next to one another, forming an array, so as to be able to simultaneously record a plurality of sample chambers, or all the sample chambers of a sample plate, has failed according to the existing prior art, in that no microscopes, comprising an objective and an imaging chip and preferably also an illumination unit, are available which have such a small design that these can be positioned at a distance next to one another in rows and columns which corresponds to the customary sample chamber distance of known sample plates, in the case of microtiter plates having 96 sample chambers, for example, less than 10 mm.

SUMMARY OF THE INVENTION

It is thus an object of the invention to provide a system that can be used, by way of an array comprising microscopes, in particular each comprising an imaging chip and microscope objective and preferably also an illumination unit, to simultaneously acquire multiple images, preferably multiple images of different sample chambers of a sample plate, and preferably of all sample chambers (wells) of a standard microtiter plate having 96 or 384 sample chambers, preferably at time intervals between the consecutive images of a video of a respective sample chamber of less than 8 seconds.

Simultaneous acquisition of images of different sample chambers shall not necessarily be understood to mean that the images intended for image evaluation following the acquisition are all acquired exactly synchronously in terms of time, but preferably only that all images intended for evaluation are acquired within a time interval provided for the acquisition, and in particular are acquired within less than 8 seconds.

Within such an interval, the individual images intended for image processing can have acquisition times that differ among one another, in particular by a few seconds, preferably less than 8 seconds, and particularly preferably less than 1 second. The individual image series shall preferably have an at least substantially constant rhythm of the recording times. Preferably, this will be understood to mean that the individual images of a video, which is associated with a respective sample chamber, have a time interval between one another which varies by less than 1%, and preferably less than 0.1%, from the temporal image interval averaged across all images.

Preferably, a further object is to design the arrangement of the individual microscopes so that the lateral distance of the optical axes (seen perpendicularly to the optical axes) between neighboring microscopes is equal to the distance between the sample chambers of a sample plate, preferably of a microtiter plate, and particularly preferably of a 96-well microtiter plate according to the ANSI industry standard.

It is furthermore preferred that external movement effects on the samples in a sample chamber are eliminated in the system according to the invention.

According to the invention, the object is achieved in that a system of the type in question described at the outset: comprises at least one carrier board, having collectively attached on the surface thereof all of the imaging chips of all of the microscopes in an array, next to one another in a row and column arrangement; comprises an electronics unit for carrying out image data processing, which is disposed laterally next to the array of imaging chips, and/or behind the array of imaging chips; and comprises an array of objectives, and in particular microscope objectives, having a corresponding row and column arrangement, which in the direction of the optical axes is disposed in front of the imaging chips.

In a preferred refinement, it is also possible for an array of illumination devices having a corresponding number of columns and rows to be provided, in addition to the array of imaging chips and the array of microscope objectives, in particular in such a way that a dedicated illumination device is associated with each microscope objective. In this way, dedicated homogeneous illumination of the microscope images can be achieved for each microscope. The illumination devices can preferably produce Köhler or modified Köhler illumination.

An array is preferably designed so that the rows and columns extend perpendicularly with respect to one another.

It will be noted that an electronics unit for carrying out image data processing is provided so as to generate images and image series (video sequences) from the data stream of the imaging chips on which the image evaluation can be based. It is also possible, but not mandatory, for this electronics unit to perform the image evaluation directly, for example with respect to tracking the movement of cells in a sample, separately provided.

The idea of the invention is that the actual limiting factor imposing constraints on how closely the photo-capable or video-capable microscopes can be disposed next to one another is essentially not the imaging chip of the respective camera, but the electronics required to process the image data stream of a respective imaging chip and the outer dimensions of the presently available microscope objectives.

At the core, the invention is based on the consideration of separating this required electronics unit locally from each imaging chip and, for multiple imaging chips, and preferably for all arrays formed on the shared carrier board, then disposing this separately therefrom.

In this way, the individual imaging chips can be positioned sufficiently closely with respect to one another in an array arrangement. The row and column arrangement of the imaging chips can be such that this corresponds to the arrangement of the sample chambers of a sample plate, and preferably of a 96-well microtiter plate according to the ANSI industry standard. Preferably, apart from conductors, no other electronic components are present inside the array formed by the imaging chips, aside from the imaging chips.

By disposing the electronics unit in regions behind the imaging chips and/or particularly preferably laterally next to an array of imaging chips, the region between adjacent imaging chips is kept free of such electronics, and thus no longer limits the arrangement thereof with respect to one another. In the invention, the only limiting factor is thus results from the size of the imaging chips themselves.

Laterally next to the array will be understood to mean that the electronics unit is positioned next to the surface area taken up on the carrier board by the array of imaging chips, in a direction perpendicular with respect to the optical axes. Behind the array will be understood to mean that the electronics unit is located on the side of the carrier board located opposite the surface comprising the imaging chips, in a direction parallel to the optical axes.

In a first possible embodiment of the lateral arrangement, it may be provided that the electronics unit for carrying out the image processing is arranged on all four sides around the array of imaging chips.

In this arrangement, the system is limited to the number of imaging chips and the associated objectives and cannot be expanded. If the number and arrangement of the microscopes formed in this embodiment, or in following embodiments, does not correspond to the number of the sample chambers of a sample plate, the invention can provide for displacing the sample plate and the array of microscopes formed, relative to one another, so as to consecutively record fields of multiple sample chambers that correspond to the size of the array formed.

In a second embodiment, the invention can provide that the electronics unit for carrying out image data processing is disposed on no more than two sides next to the array of imaging chips, and in particular on the two opposing sides or on the two mutually abutting sides. With such an arrangement of the electronics unit, the carrier boards, which each comprise an array, can be disposed in two directions next to one another so as to increase the overall array size.

In a further particularly preferred option, the electronics unit for carrying out image data processing can be disposed on only one side next to the array of imaging chips. In this case, carrier boards, together with the respective arrays thereof, can be disposed on three sides next to one another so as to increase the effective total array size.

When the electronics unit is disposed behind the imaging chips, for example on the back of the carrier board or on a circuit board located parallel thereto, there is even the option of consecutively disposing the carrier boards on all four sides of a respective individual array, in particular when, in the cross-section perpendicular with respect to the optical axis, the electronics unit or a circuit board comprising the same does not protrude beyond the array surface area.

In all these possible embodiments, the invention can provide that the electronics unit for carrying out image data processing is at least partially, and preferably completely, disposed on the same carrier board to which all imaging chips of the array are attached.

In one embodiment, the invention can also provide that the cable connections from the imaging chips to said electronics unit are guided out of the array surface area of the carrier board or to the rear out of the carrier board in the direction toward the sides, preferably toward only two sides, and particularly preferably only in the direction of one of the sides. The electronics unit itself can then be coupled to these cable connections, for example by way of flexible lines. Preferably, the electronics unit can thus be essentially arbitrarily positioned relative to the array.

A preferred embodiment can provide that the electronics unit for carrying out image data processing is configured to process the image data of all imaging chips of the same array. If the electronics unit is not able to process the individual data streams of the individual imaging chips simultaneously, the invention can provide that the data is processed in a temporally multiplexed manner. In such a case, at least one multiplexer electronics unit, and in particular one multiplexer electronics unit per imaging chip on the carrier board, can be disposed on the side facing away from the imaging chips.

As was already mentioned with regard to the preceding embodiments, the invention can provide that the effective array size of a system consists of multiple arrays of different carrier boards. For this purpose, for example, multiple carrier boards can be disposed next to one another in a shared attachment plane, wherein adjacent carrier boards abut one another with the sides thereof kept free of the electronics unit.

Such an arrangement has the further advantage that not only is the optical acquisition surface area increased, but the carrier boards and the electronics unit disposed thereon, or at least the electronics unit associated therewith, can also be operated simultaneously for data purposes. Each electronics unit thus only has to provide sufficient processing power for processing the data streams of the imaging chips of the respective array in the desired time, wherein the data streams of all imaging chips of the total array formed are nonetheless processed in the same time due to the simultaneous operation. A total system can thus be internally divided into individual clusters, wherein each cluster only processes the data of the array of imaging chips located thereon.

In a higher-level data processing and/or evaluation system, the processed data of each cluster can be combined.

The arrangement is preferably selected so that the distance between the optical axes of two imaging chips/objectives of different carrier boards disposed directly adjacent to one another in the same column and/or row direction corresponds to the distance between the optical axes of the imaging chips/objectives of the array of each carrier board. In this way, a total array can be formed of multiple arrays or carrier boards which is able, for example, to acquire all sample chambers of a microtiter plate simultaneously.

A refinement, which can be combined with all preceding embodiments, can provide that the system comprises an attachment structure to which at least one carrier board, and preferably all carrier boards, and the objectives of the imaging chips of the at least one array, and preferably all objectives of the imaging chips of all arrays, in particular also the respective illumination elements of all objectives or imaging chips, are collectively attached. This results in a single cohesive unit composed of a plurality of microscopes that can be handled together, and thus equally for all microscopes.

The attachment structure can comprise a single retaining frame in which all objects of the at least one array of imaging chips, and preferably the objectives of all arrays in the case of multiple arrays, are collectively attached. Such a retaining frame can be disposed at a distance in front of the imaging chips, in the direction of the optical axes.

It is furthermore preferred that each of the objectives in the attachment structure, and preferably in the retaining frame, can be designed so as to be adjustable in terms of the position relative to the associated imaging chip, at least in the direction of the optical axis. For example, this can be achieved by causing the objective to be rotatable in a threaded mount, for example a thread in the retaining frame.

It is also possible to cause the objective to be displaceable only in a direction parallel to the optical axis, in a play-free manner, in a recess in the retaining frame. After positioning, the objective can be fixed, for example by way of bonding. Thus, the image plane of each objective can optionally be individually adjusted with respect to the associated imaging chip.

A particularly preferred embodiment of the system can provide that each of the objectives comprises a cylindrical, and preferably a circular cylindrical, tube, which has the same outer cross-section, and preferably outer diameter, over the entire axial length thereof, wherein the lenses of the objective are accommodated in the tube. Thus, the objectives can optionally be disposed next to one another in a simple and space-saving design.

The invention can furthermore provide that the attachment structure also comprises a further retaining frame for the illumination devices, and in particular a retaining frame in which the same number of illumination devices are attached as there are microscopes in the entire system.

The retaining frame for the illumination devices and the retaining frame for the objectives can be disposed with respect to one another in the attachment structure in such a way that a sample plate can be positioned between the two retaining frames. For this purpose, the attachment structure can form a U shape with the two retaining frames, which can surround a sample plate. The two retaining frames preferably form the legs of the U shape. The two retaining frames are fixedly joined to one another by way of this arrangement.

In this way, a transmitted light arrangement can be created, in particular in which the light, coming from the illumination devices, transilluminates the sample chambers from above and reaches the microscopes located beneath the bottoms of the sample chambers.

Each illumination device of a respective microscope can be formed by an optical fiber, the light emission end of which is held in the retaining frame. In one possible embodiment, the retaining frame can comprise a lens/diaphragm system for each optical fiber in the beam direction behind the light outcoupling end of the optical fiber so as to produce Köhler illumination. Such a lens/diaphragm system can, however, also be provided on the light incoupling side of the optical fiber, which is to say in the beam direction in front of the light incoupling surface of the optical fiber.

The optical fibers can each comprise dedicated light sources, such as light-emitting diodes, and preferably white light LEDs.

However, the invention can also provide that all optical fibers are supplied by a shared light source. Such a shared light source can, in turn, be a light-emitting diode, for example.

A preferred embodiment can provide that an Ulbricht sphere is used as the shared light source, into which multiple separate light sources, such as light-emitting diodes, irradiate light. A respective end of each optical fiber intended for light incoupling is then connected to an opening in the lateral face of the Ulbricht sphere. All optical fibers may be connected to the same shared opening.

Here, connection can be achieved indirectly by way of a lens/diaphragm system, provided the beam shaping for producing Köhler illumination is implemented on the light incoupling side of the optical fibers.

When using an Ulbricht sphere as the light source, it may be provided that multiple light-emitting diodes or multiple other light generators are connected, by way of which light having different spectral compositions can be coupled into the Ulbricht sphere. Thus, the illumination spectrum can optionally be changed without changing the optical path.

In conjunction with all aforementioned embodiments of the light source(s), the invention can provide for cycled operation of LEDs so as to limit the "exposure to illumination" to which the samples in the sample chambers are subjected to the times when images are being acquired.

In a refinement of the invention the system can comprise an actuator system, and in particular a piezo actuator system, by way of which the attachment structure can be displaced at least in the direction of the optical axis (Z), and preferably also in a plane perpendicular thereto (XY), relative to a mount of a sample plate, and thus also relative to a sample plate accommodated therein. Thus, the focal position of the individual microscopes (comprising the imaging chip and the objective, if necessary also the illumination device) can optionally be changed with respect to the sample to be acquired simultaneously, for all cameras of the system. Individual focusing devices can thus be eliminated, which simplifies the design and the electronics of the system.

Since the samples to be acquired usually do not all have the same focal position in the sample chambers, this may cause one or more microscopes to be aligned in a correctly focused manner, and one or more microscopes in an incorrectly focused manner, which is to say in an out of focus manner, with respect to the particular sample.

So solve this problem, a refinement can provide that the system comprises a control unit, which is used to activate said actuator system in a periodically recurring manner so as to consecutively set, preferably incrementally, different distances (seen in the direction of the optical axes) between the attachment structure and the mount of a sample plate, or of the held sample plate, within an activation period, and to record at least one image for each set distance using all sample imaging chips of the array or the arrays.

During each activation period, a plurality of images, and preferably a number of images corresponding to the number of increments, is thus recorded, each having different focusing, so that both sharp and out-of-focus images are acquired, in particular since the adjustment is preferably carried out so that the ideal focal position is traversed by every microscope during such an activation period.

According to the invention, the sharpest image of all images is selected for each imaging chip from the recorded images of every activation period, and only this is used for further image evaluation, the remaining images of the same activation period being discarded. This image processing can be carried out by the electronics unit, which is disposed on the carrier board or at least associated with a respective array.

For this purpose, it may be provided to compare the image recorded during the activation period at a particular distance, in terms of the sharpness thereof, to that which was previously recorded or previously stored, to discard the current one if the sharpness is worse, and the continue to store the existing one or, if the sharpness is better, to store the current one for the next comparison that follows, and to discard the existing one. In this embodiment, it is not necessary to store a complete set of images of an activation period.

The invention can furthermore provide that the system comprises an actuator system, which can be used to displace the attachment structure perpendicularly to the optical axes, and in particular in the direction of the rows and columns of the imaging chips, relative to a mount of a sample plate, and thus a held sample plate. This makes it possible to record a sample plate in fields using an array of microscopes which, in terms of the number and arrangement, is smaller than the number of sample chambers (wells) in the entire sample plate. In this way, for example, film sequences can be generated, preferably at time intervals of less than 8 seconds between consecutive images of a video of each sample chamber, for all sample chambers (wells) of a microtiter plate, and preferably of a 384-well microtiter plate according to the ANSI industry standard.

In a system in which the number of microscopes corresponds to the number of samples chambers of a sample plate, an actuator system for moving the attachment structure perpendicularly to the optical axes can essentially be eliminated, but may preferably be provided here as well, so as to simplify an at least one-time lateral adjustment of the microscopes with respect to the sample plate to be examined. The actuator system for moving the attachment structure parallel to the optical axes and the actuator system for the movement perpendicular to the optical axes are thus preferably implemented together in a system according to the invention.

The embodiment is particularly advantageous when the mount of the sample plate is disposed in a stationary manner in the ground reference system, which is to say the microscope array, and the preferred array of illumination devices is moved in the ground reference system, in particular by way of the attachment structure shared by all arrays. In this way, no movement momentum is exerted on the samples, as has previously been the case with the prior art.

The invention preferably provides that each individual image that is acquired by the imaging chip of each microscope is assigned a time stamp, and in particular time information about the acquisition time, preferably wherein the time stamp is based on a clock shared by all images/imaging chips. In this way, the time interval between images of a respective microscope and between images of different microscopes can be ascertained, and documented if necessary. A clock used for this purpose can be implemented in the shared electronics unit, for example, which is disposed on the carrier board or at least connected thereto.

DETAILED DESCRIPTION OF THE INVENTION

Embodiments of the invention will be described hereafter based on the figures.

Figure 1:
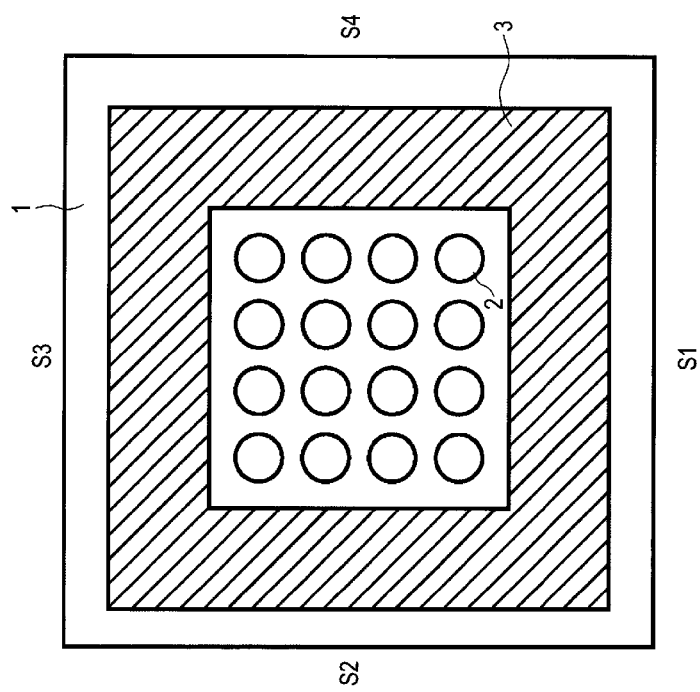
FIG. 1 shows a plan view of the first embodiment of the invention in which the carrier board comprises a 4×4 array of imaging chips.

FIG. 1 shows a plan view of a first embodiment of the invention in which a carrier board 1 comprises an array of imaging chips 2. The chips are disposed in a 4×4 matrix here. Thereabove, but not shown here, is disposed a corresponding array of objectives, and preferably illumination devices, so as to form an overall microscope array.

An electronics unit 3 is disposed laterally around the array, which thus surrounds the array here on all four sides S1, S2, S3 and S4.

This arrangement allows 16 samples in the sample chambers of a microtiter plate to be acquired simultaneously, for example. If more samples are to be acquired, the arrangement shown here must be displaced perpendicularly with respect to the optical axes, for which purpose an actuator system can be provided.

Figure 2:
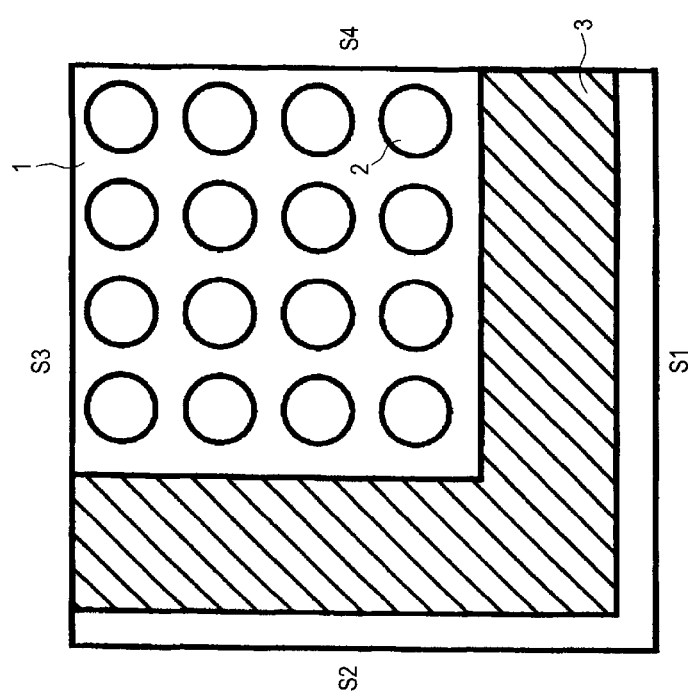
FIG. 2 shows a plan view of an alternative in which the circuit board likewise comprises a 4×4 array of imaging chips.

FIG. 2 shows an alternative in which the circuit board 1 likewise comprises a 4×4 array of imaging chips 2. Here, the electronics unit 3 is only disposed on two sides, namely on the sides S1 and S2, next to the array. This makes it possible to dispose 4 such circuit boards in 4 quadrants next to one another and to form a total array of an 8×8 size. Each of the carrier boards can form a stand-alone duster with the electronics unit thereof, for example an FPGA, in this and the following embodiments, which is configured to process the data of the imaging chips of the array, and to relay this, via an interface, to an image evaluation unit. The illustration will be understood to be of a symbolic nature and is not true to scale.

Figure 3:
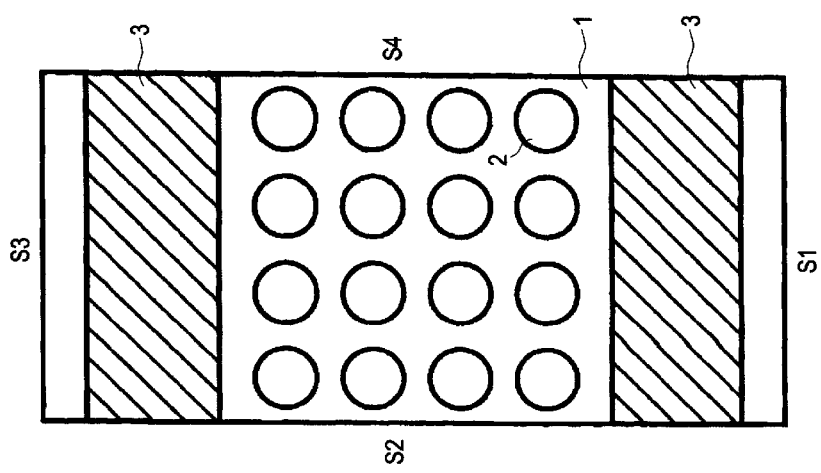
FIG. 3 shows a further alternative in which the electronics unit is disposed next to the array on two opposing sides of the carrier board.

FIG. 3 shows a further alternative in which the electronics unit is disposed next to the array on the two opposing sides S1 and S3 on the carrier board 1. Here, circuit boards 1 may be disposed consecutively on the sides S4 or S2. The illustration will be understood to be of a symbolic nature and is not true to scale.

Figure 4:
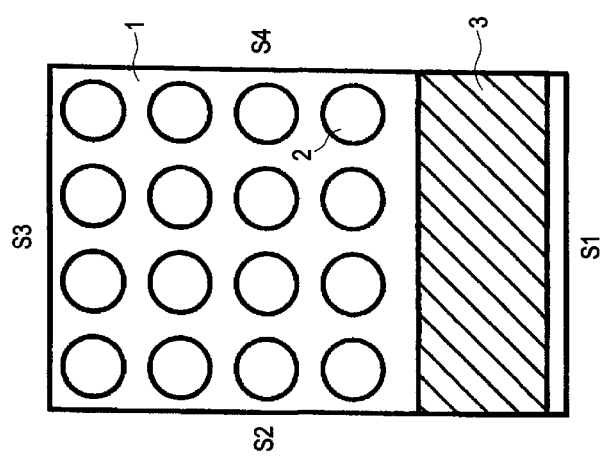
FIG. 4 shows a further alternative in which the electronics unit is disposed next to the array only on one side of the array and other identical circuit boards can be disposed on other sides of the array.

The preferred embodiment is shown in FIG. 4. An array having a size of 4×4 is kept free of electronics unit on three sides S2, S3 and S4 here and thus other identical circuit boards 1 can be consecutively disposed on these sides. The electronics unit is disposed next to the array only on side S1 here.

The ability to dispose consecutively in the embodiments of FIGS. 1 to 4 is preferably achieved when the circuit board, on the sides kept free of electronics unit, does not protrude beyond the imaging chips disposed there, or protrudes only so far that the distance of the optical axes of two imaging chips, or the objectives thereof, on two different circuit boards can also assume exactly the distance that is present on each individual circuit board within the array thereof in the case of consecutive disposition on such a side. In this way, equidistant distancing of the optical axes can be achieved across circuit boards in the total array formed from all of the individual arrays. The illustration will be understood to be of a symbolic nature and is not true to scale.

Figure 5:
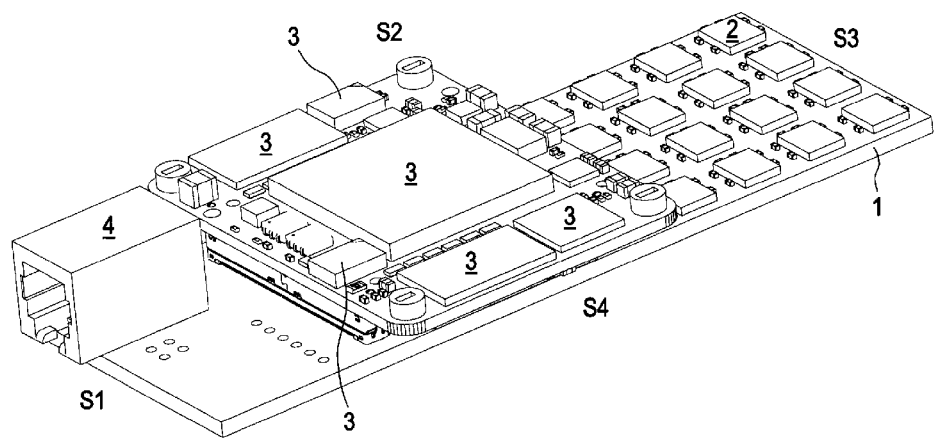
FIG. 5 shows in some detail a unit according to the invention, referred to as a "cluster", which comprises a carrier board on which the imaging chips are positioned in a 4×4 array.

FIG. 5 shows, in greater detail, a unit referred to above as a cluster, which comprises such a carrier board 1 on which the imaging chips 2 are positioned in a row and column arrangement, in the form of a 4×4 arrangement here. The invention is not limited to this specific arrangement, but can form arrays in general having an n×m arrangement, wherein n and m are preferably greater than or equal to 2.

Here, the electronics unit 3, which is likewise supported by the carrier board 1, is disposed next to the array toward side S1. The electronics unit 3 may be disposed in a different plane than the imaging chips 2. It is furthermore apparent that the carrier board 1 on the side S1 also comprises an interface 4, via which the image data collected by all imaging chips 2 can be relayed to a higher-level image evaluation unit.

Without being limited to the figures shown, the invention is generally applicable, and can provide that, after a respective new image of each imaging chip is relayed to an image evaluation unit, in particular via said interface 4, this image associated with each imaging chip is added to a respective video produced for each imaging chip 2 from the images. Image evaluation can then take place immediately after the image has been added to the video, for example tracking of an observed, moving sample may take place, so that image evaluation also takes place for each newly added image, and not only after a total video has been created.

Figure 6:
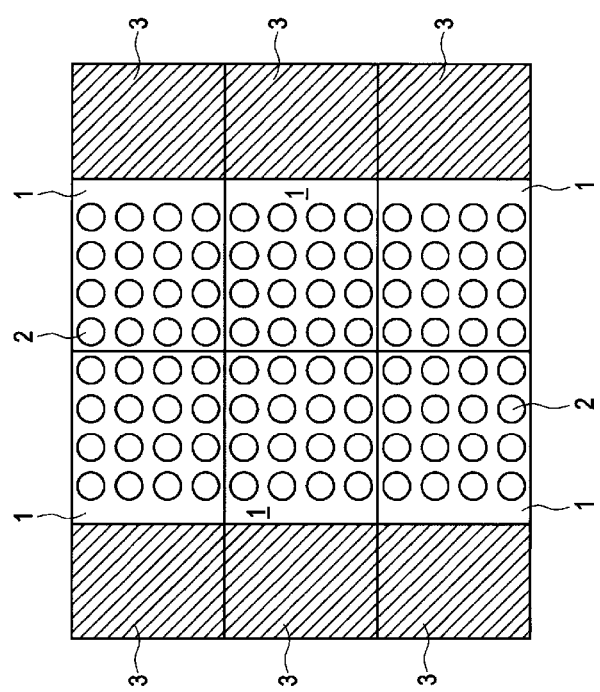
FIG. 6 schematically shows a plan view of the consecutive disposition of carrier boards of FIGS. 4 and 5 to form a total array having 8×12 microchips, each microchip comprising a respective microscope.

FIG. 6 schematically shows a plan view of the consecutive disposition of carrier boards 1 of FIGS. 4 and 5 to form a total array having 8×12 microchips, each microchip comprising a respective microscope. In this way, it is possible to simultaneously acquire all the sample chambers of a microtiter plate having 96 sample chambers. For this purpose, the distance between all the optical axes of the small microscopes in each individual array and the total array formed preferably corresponds to the distance between the sample chambers in the microtiter plate, and in particular specifically 9.1 mm here. Since different microtiter plates, and in particular the 96-well plates, can certainly have slightly varying distances between the sample chambers (wells), while having identical outer dimensions, the invention preferably provides that the distances between the optical axes in the array are selected so as to be at least less than 9.5 mm, and in particular so as to acquire all distance variants.

Figure 7:
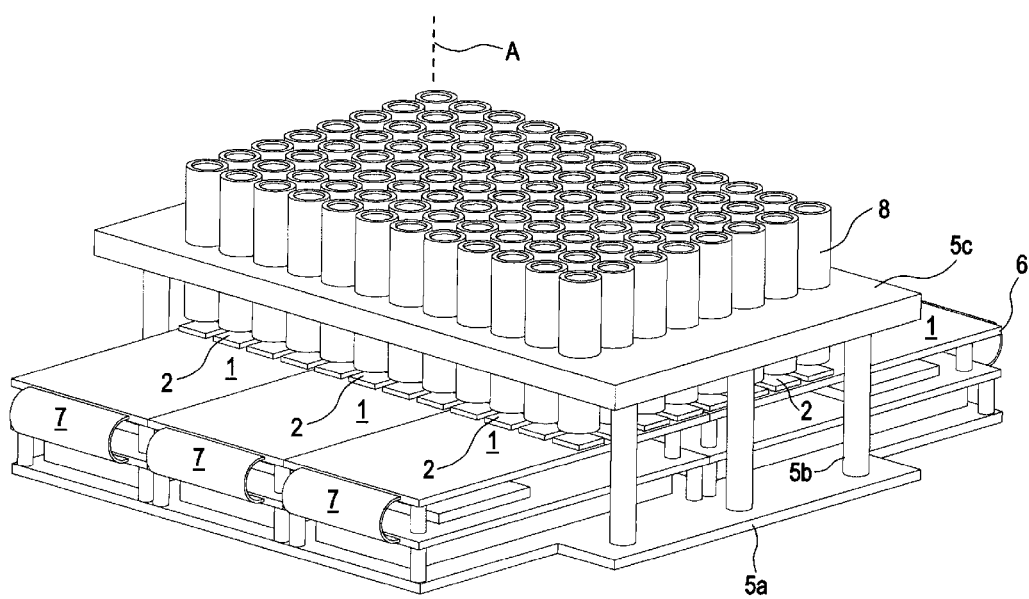
FIG. 7 shows in some detail another unit according to the invention.

FIG. 7 shows such an arrangement with greater design detail. It is apparent here that an attachment structure 5a, 5b, 5c is provided, by way of which the individual circuit boards 1 can be secured in fixed positions next to one another to form the total array.

In addition to the consecutively disposed circuit boards 1, further circuit boards 6 can be disposed in a lower plane, which comprise the aforementioned electronics unit 3, and/or a data processing electronics unit, and/or an image evaluation electronics unit, in the other plane, to which the data is, or the signals are, relayed via flexible connectors 7.

It is essential to the invention in this embodiment, independently from the specifically shown arrangement of the electronics unit, that the attachment structure comprises a retaining frame 5c, which is disposed in a plane above the imaging chips 2, in the direction of the optical axes A, and which holds all the microscope objectives 8, which are each associated with one of the imaging chips 2 of the arrays. The objectives 8 can be mounted in a stationary manner relative to one another and to the attachment structure, so that the arrangement shown here forms, in the overall, a microscope unit including a plurality of microscopes (96 here), which can all be moved together with the unit with respect to a microtiter plate, which is not shown here.

The respective objectives 8, in this embodiment, are formed by cylinders that have a circular cross-section and contain lenses and that preferably have an outer diameter of less than 9 mm, and more preferably of less than 8 mm.

The unit shown in FIG. 7 can be moved, as a whole, by way of an actuator system in the direction of the optical axes A so as to simultaneously adjust the focusing of all the microscopes 2, 8 with respect to the samples.

Figure 8:
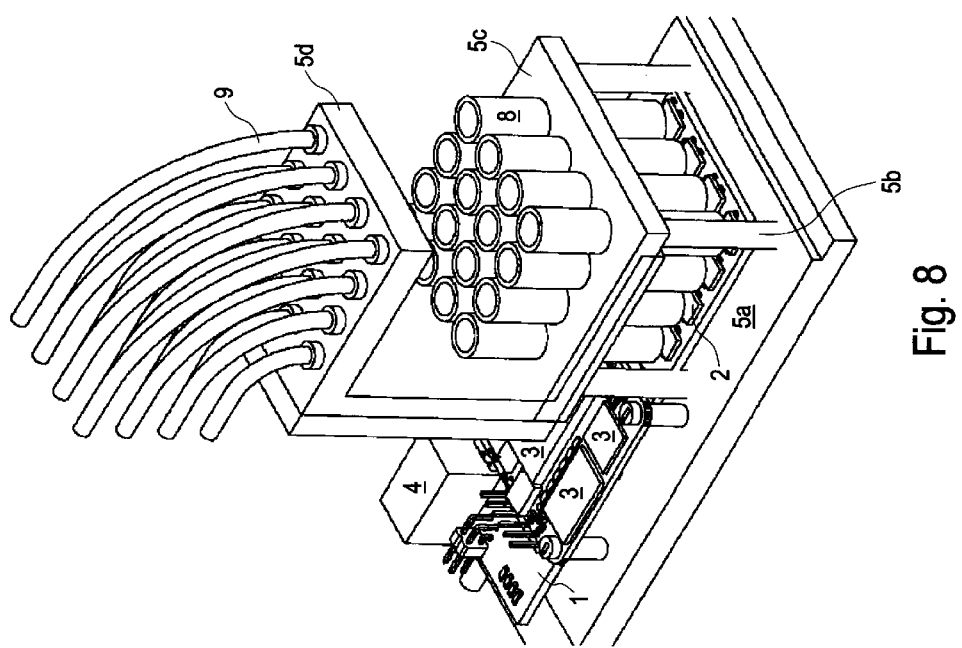
FIG. 8 shows an embodiment of the invention including illumination devices comprising optical fibers.

FIG. 8 shows an embodiment in which the attachment structure, in addition to the retaining frame 5c for the objectives 8, also comprises a retaining frame 5d for illumination devices 9, which are designed as optical fibers 9 here. A sample plate, which is not shown, can be disposed between the retaining frames 5c and 5d so as to operate the microscopy in a transmitted light configuration. FIG. 8 shows a device according to the invention that, similarly to FIG. 7, can be increased in terms of the number of microscopes by consecutive disposition. The arrangement of FIG. 8 corresponds to FIG. 5 with the addition of the attachment structure.

Figure 9:
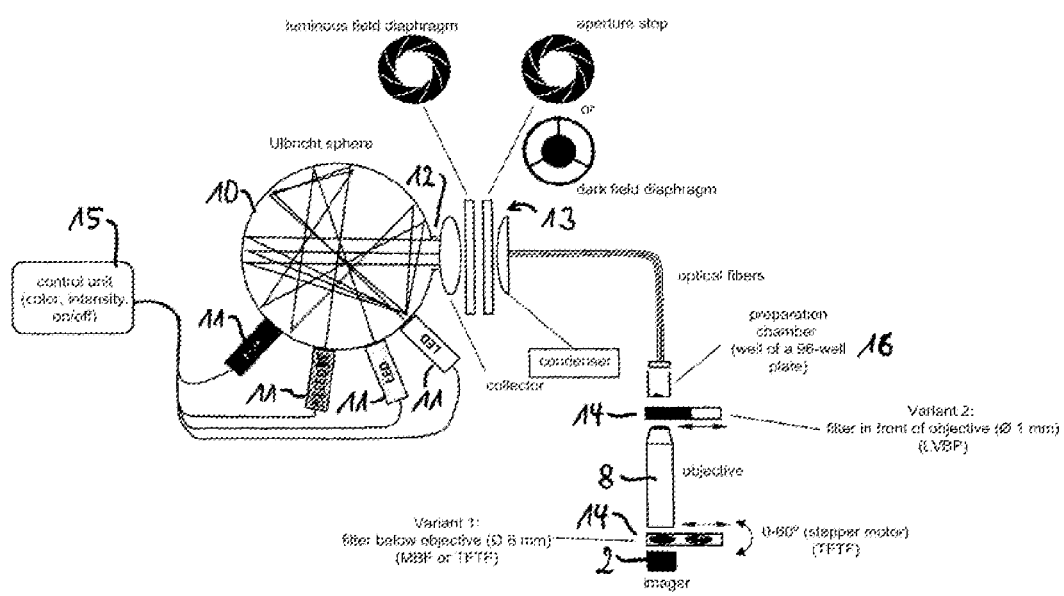
FIG. 9 schematically illustrates a preferred operating principle of each of the multiple microscopes of an embodiment according to the invention.

FIG. 9 shows a preferred operating principle of each of the multiple microscopes of the embodiment according to the invention. Imaging chips 2 and microscope objectives 8 form one of the multiple microscopes of the devices shown in the preceding figures, which is used to observe the sample present in the sample chamber 16 from the side of the bottom base of the chamber. The circuit boards and the attachment structure are not shown in this FIG. 9, but preferably correspond to the respective embodiments described for the preceding figures.

The illumination device of the microscope is formed by an optical fiber 9, as was described for FIG. 8. The light source for this and any other optical fiber is formed by an Ulbricht sphere 10 in this preferred embodiment. Using multiple light generators 11, which are LEDs here, and which emit light having differing spectra, it is possible to selectively illuminate the interior of the Ulbricht sphere, alternatively or in combination. The internal scattering results in a homogeneous light distribution across the entire space of the Ulbricht sphere having the spectrum of the one selected light generator 11 or having a mixed spectrum of the spectra of multiple simultaneously operated light generators 11. At an opening 12 in the Ulbricht sphere, the optical fiber 9 is coupled indirectly by way of a lens/diaphragm system 13 so as to obtain what is known as Köhler illumination. In this system 13, a luminous field diaphragm can be selectively combined with an aperture stop or a dark field diaphragm.

By using filters 14, which are alternatively disposed in front of or behind the objective 8, an evaluating wavelength from the spectrum of the light source 10 or a converted wavelength emitted by one of the samples, for example by way of fluorescence, can be selected for observation by the imaging chip. By displacing and/or rotating the filters 14, it is possible to select regions of the filters 14 acting in different wavelength-selective manners.

A control unit 15 can preferably control the light generators so that the samples are only illuminated when an image is being acquired. Between the image acquisitions, the light sources are preferably switched off so as to reduce the exposure of the preferably living samples to light or prevent a degradation of fluorescent dyes.

The invention claimed is:

1. A system for the simultaneous videographic or photographic acquisition of images of samples in a plurality of sample chambers of a sample plate, comprising:
    microscopes having mutually parallel optical axes, each microscope comprising a dedicated imaging chip and a dedicated objective;
    a carrier board having attached on a surface thereof the imaging chips in an array of rows and columns;
    an electronics unit configured to carry out image data processing and disposed laterally next to the array of imaging chips or behind the array of imaging chips; and
    a sample plate comprising sample chambers in an array of rows and columns;
    wherein the microscope Objectives are disposed in an array of rows and columns in registry with the array of the imaging chips and situated in front of the imaging chips in the direction of the optical axes,
    wherein the array of sample clambers is in registry with the array of microscope objectives,
    wherein the distance of the optical axes in the row and column directions of the imaging chips and the objectives thereof corresponds to the distance between the sample chambers of the sample plate in the same directions, and
    wherein the microscope array and the sample plate are not free to move relative to each other in any direction in planes orthogonal to the optical axes of the microscopes.

2. The system according to claim 1, further comprising illumination devices disposed in an array of rows and columns in registry with the array of microscope objectives and the array of imaging chips and situated in front of the objectives in the direction of the optical axes.

3. The system according to claim 1, wherein the carrier board is quadrilateral and the electronics unit for carrying out the image data processing is disposed on all four sides of the carrier board.

4. The system according to claim 1, wherein the carrier board is quadrilateral and the electronics unit for carrying out the image data processing is disposed only on two opposing sides or the two mutually abutting sides of the carrier board.

5. The system according to claim 1, wherein the carrier board is quadrilateral and the electronics unit for carrying out the image data processing is disposed on only one side of the carrier board.

6. The system according to claim 1, wherein the electronics unit for carrying out the image data processing is disposed at least partially on the same carrier board to which the array of the imaging chips are attached.

7. The system according to claim 1, further comprising cable connections from the imaging chips to the electronics unit for carrying out the image data processing, wherein the cable connections extend from a face of the carrier board to which the array of imaging chips is attached or to the other face of the carrier board, and extend toward only one side of the carrier board.

8. The system according to claim 1, wherein the electronics unit for carrying out the image data processing is configured to process in a temporally multiplexed manner the image data of all the imaging chips of the same array.

9. The system according to claim 8, wherein the electronics unit for carrying out the image data processing comprises one multiplexer electronics unit per all the imaging chips, the multiplexer electronics unit being disposed on the carrier board on a face of the carrier board facing away from the imaging chips.

10. The system according to claim 1, comprising a plurality of the carrier boards, the carrier boards each being quadrilateral and having a respective row and column array of the imaging chips attached to a face of the respective carrier board and the carrier boards being disposed next to one another with the arrays of the imaging chips in a same plane to form a combined array of the imaging chips in rows and columns, wherein mutually abutting sides of adjacent ones of the carrier boards do not abut the electronics unit.

11. The system according to claim 10, wherein distance between adjacent ones of the optical axes is the same throughout the combined array, including between adjacent ones of the carrier bonds.

12. A system according to claim 2, further comprising respective attachment structures to which the carrier board, the objectives, and the illumination devices are respectively attached.

13. The system according to claim 12, wherein the the attachment structures comprise a retaining frame in which the objectives are attached, and another retaining frame in which the illumination devices are attached.

14. The system according to claim 12, wherein each of the objectives is adjustable in the direction of the optical axis thereof relative to the imaging chip on that optical axis.

15. The system according to claim 1, wherein each of the objectives comprises a circular cylindrical tube of a same outer diameter over an entire axial length thereof, and lenses of the objective are accommodated in the tube.

16. The system according to claim 12, further comprising a piezo actuator system configured to incrementally displace via the attachment structures individual ones of the imaging chips, objectives and illumination devices in the direction of the optical axis relative to a mount of the sample plate.

17. The system according to claim 16, further comprising a control unit configured to activate the actuator system in a periodically recurring manner so as to incrementally set via the attachment structures different distances between the imaging chips, objectives and illumination devices and the mount of the sample plate, and to record at least one image for each distance set using all the imaging chips.

18. The system according to claim 17, wherein the control unit is configured to select the sharpest image of all images recorded by each of the imaging chips in a particular period of activation of the actuator system for further image evaluation, and to discard the remaining images of the same activation period.

19. The system according to claim 12, further comprising an actuator system configured to displace individual components of the attachment structure perpendicularly to the optical axes in directions of the rows and columns of the imaging chips, relative to a mount of a sample plate which is stationary.

20. The system according to claim 17, wherein the electronics unit configured to carry out image data processing comprises a clock configured to assign a time stamp to each individual image that is acquired by the imaging chip of each of the microscopes.

21. The method according to claim 20, wherein the distance is less than 9.5 mm.

\* \* \* \* \*